(12) United States Patent
Whelan et al.

(10) Patent No.: US 9,176,231 B2
(45) Date of Patent: Nov. 3, 2015

(54) SYSTEM AND METHODS FOR REDUCING GNSS RECEIVER POWER USAGE BY LEVERAGING SIGNALS OF OPPORTUNITY TO PREDICT GNSS AVAILABILITY

(71) Applicant: The Boeing Company, Chicago, IL (US)

(72) Inventors: David A. Whelan, Newport Coast, CA (US); Gregory M. Gutt, Ashburn, VA (US); Michael L. O'Connor, Redwood City, CA (US)

(73) Assignee: The Boeing Company, Chicago, IL (US)

( * ) Notice: Subject to any disclaimer, the term of this patent is extended or adjusted under 35 U.S.C. 154(b) by 377 days.

(21) Appl. No.: 13/712,896

(22) Filed: Dec. 12, 2012

(65) Prior Publication Data

US 2014/0159953 A1 Jun. 12, 2014

(51) Int. Cl.
*G01S 19/24* (2010.01)
*G01S 19/34* (2010.01)
*G01S 5/02* (2010.01)

(52) U.S. Cl.
CPC .............. *G01S 19/24* (2013.01); *G01S 5/0252* (2013.01); *G01S 19/34* (2013.01)

(58) Field of Classification Search
CPC .......... G01S 19/24; G01S 19/30; G01S 19/34
USPC ............. 342/357.63, 357.65, 357.74, 357.77; 701/468, 490
See application file for complete search history.

(56) References Cited

U.S. PATENT DOCUMENTS

| 6,438,381 | B1 | 8/2002 | Alberth, Jr. et al. |
| 2004/0176127 | A1 | 9/2004 | Ballantyne et al. |
| 2009/0192709 | A1 | 7/2009 | Yonker et al. |
| 2010/0271260 | A1 | 10/2010 | Guo |

OTHER PUBLICATIONS

PCT/US2013/072414—International Search Report and Written Opinion dated Apr. 11, 2014 filed on the basis of the subject U.S. pending application.
Form PCT/IB/326, Notification Concerning Transmittal of International Preliminary Report on Patentability, dated Jun. 25, 2015.

*Primary Examiner* — Dao Phan
(74) *Attorney, Agent, or Firm* — McDonnell Boehnen Hulbert & Berghoff LLP

(57) ABSTRACT

A system and methods for reducing navigation satellite receiver power usage are presented. A wireless signal is received at a portable electronic device in a signal environment. At signal characteristic of the wireless signal at the portable electronic device is measured in the signal environment. An estimated signal strength of the wireless signal in the signal environment is estimated based on the signal characteristic. The estimated signal strength is compared to an expected signal strength of the wireless signal to calculate an estimated signal-strength-change relative to the expected signal strength. A GNSS signal is tracked at the portable electronic device, if the estimated signal-strength-change indicates an expected GNSS signal attenuation is lower than a signal attenuation threshold. The tracking of the GNSS signal is reconfigured at the portable electronic device, if the expected GNSS signal-strength-change indicates the expected GNSS signal attenuation is greater than the signal attenuation threshold.

20 Claims, 3 Drawing Sheets

SYSTEM AND METHODS FOR REDUCING GNSS RECEIVER POWER USAGE BY LEVERAGING SIGNALS OF OPPORTUNITY TO PREDICT GNSS AVAILABILITY

FIELD

Embodiments of the present disclosure relate generally to portable electronic devices. More particularly, embodiments of the present disclosure relate to systems for reducing power usage of portable electronic devices.

BACKGROUND

Global Navigation Satellite Systems (GNSS), such as GPS, GLONASS, Galileo, and Beidou, consume electrical power when implemented on an electronic device. On a mobile electronic device, due to limited battery capacity, it is highly desirable to conserve power in order to lengthen a time that the mobile electronic device may operate between battery charges. In some physical environments, GNSS signals are blocked or attenuated to a point that they cannot be reliably tracked by the mobile electronic device and used for navigation. For example, in many indoor environments, a roof of a building may block or attenuate the GNSS signals to a point of being ineffective for navigation by the mobile electronic device.

SUMMARY

A system and methods for reducing navigation satellite receiver power usage are presented. A wireless signal is received at a portable electronic device in a signal environment. A signal characteristic of the wireless signal at the portable electronic device is measured in the signal environment. An estimated signal strength of the wireless signal in the signal environment is estimated based on the signal characteristic. The estimated signal strength is compared to an expected signal strength of the wireless signal to calculate an estimated signal-strength-change relative to the expected signal strength. A global navigation satellite system (GNSS) signal is tracked at the portable electronic device, if the estimated signal-strength-change indicates an expected GNSS signal attenuation is lower than a signal attenuation threshold. The tracking of the GNSS signal is reconfigured (for example, by deactivation) at the portable electronic device, if the estimated signal-strength-change indicates the expected GNSS signal attenuation is greater than the signal attenuation threshold.

In this manner, embodiments of the disclosure provide systems and methods for reducing navigation satellite receiver power usage in a mobile electronic device.

In an embodiment, a method for reducing GNSS receiver power usage in a portable electronic device receives at least one wireless signal at a portable electronic device in a signal environment. The method further measures at least one signal characteristic of the at least one wireless signal at the portable electronic device in the signal environment. The method further estimates an estimated signal strength of the wireless signal in the signal environment based on the signal characteristic. The method further compares the estimated signal strength to an expected signal strength of the at least one wireless signal to calculate an estimated signal-strength-change relative to the expected signal strength. The method further tracks a GNSS signal at the portable electronic device, if the estimated signal-strength-change indicates an expected GNSS signal attenuation is lower than a signal attenuation threshold. The method further reconfigures tracking of the GNSS signal at the portable electronic device, if the estimated signal-strength-change indicates the expected GNSS signal attenuation is greater than the signal attenuation threshold.

In another embodiment, a system for reducing GNSS receiver power usage in a portable electronic device comprises: a first receiver, a processor module, and a second receiver. The first receiver receives a wireless signal at a portable electronic device in a signal environment, and measures a signal characteristic of the wireless signal at the portable electronic device in the signal environment. The processor module estimates an estimated signal strength of the wireless signal in the signal environment based on the signal characteristic. The processor module also compares the estimated signal strength to an expected signal strength of the wireless signal to calculate an estimated signal-strength-change relative to the expected signal strength. The second receiver receives a GNSS signal at the portable electronic device, if the estimated signal strength change indicates an expected GNSS signal attenuation lower than a signal attenuation threshold. The second receiver also reconfigures receiving the GNSS signal at the portable electronic device, if the estimated signal strength change indicates the expected GNSS signal attenuation is greater than the signal attenuation threshold.

In a further embodiment, a non-transitory computer readable storage medium comprises computer-executable instructions for reducing navigation satellite receiver power usage in a portable electronic device. The computer-executable instructions receive a wireless signal at a portable electronic device in a signal environment, and measures a signal characteristic of the wireless signal at the portable electronic device in the signal environment. The computer-executable instructions further estimates an estimated signal strength of the wireless signal in the signal environment based on the signal characteristic. The computer-executable instructions further compares the estimated signal strength to an expected signal strength of the wireless signal to calculate an estimated signal-strength-change relative to the expected signal strength. The computer-executable instructions further tracks a GNSS signal at the portable electronic device, if the estimated signal-strength-change indicates an expected GNSS signal attenuation is lower than a signal attenuation threshold. The computer-executable instructions further reconfigures tracking of the GNSS signal at the portable electronic device, if the estimated signal-strength-change indicates the expected GNSS signal attenuation is greater than the signal attenuation threshold.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
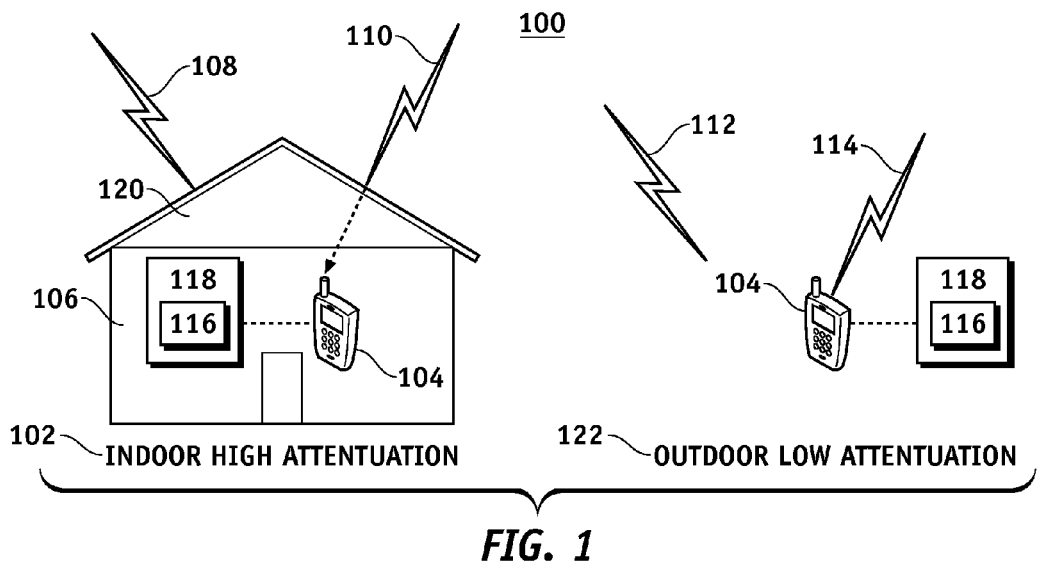
FIG. 1 is an illustration of an exemplary signal environment.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to communication systems, GNSS tracking techniques, GNSS search algorithms, network protocols, global positioning systems, cloud computing, and other functional aspects of the systems (and the individual operating components of the systems) may not be described in detail herein.

Embodiments of the disclosure are described in the context of a non-limiting application, namely, a mobile phone. Embodiments of the disclosure, however, are not limited to such mobile phone, and the techniques described herein may also be utilized in other applications requiring usage of portable power storage devices or requiring reduced power usage for any other reason such as thermal or cost reasons. For example, embodiments may be applicable to a desktop computer, a laptop or notebook computer, an iPad™, an iPod™, a cell phone, a personal digital assistant (PDA), a mainframe, a server, a router, an internet protocol (IP) node, a Wi-Fi node, a client device, or any other type of special or general purpose computing device as may be desirable or appropriate for a given application or environment.

As would be apparent to one of ordinary skill in the art after reading this description, the following are examples and embodiments of the disclosure, and are not limited to operating in accordance with these examples. Other embodiments may be utilized and changes may be made without departing from the scope of the exemplary embodiments of the present disclosure.

Embodiments provide a system and methods for using a wireless signal to determine a likelihood that a portable electronic device will be able to track GNSS signals. Embodiments use the likelihood to decide whether to "turn on" a GNSS receiver in the portable electronic device. The determination of the likelihood using the wireless signal in a wireless receiver can be made with less power than would be required using a GNSS signal in a GNSS receiver, and thereby power consumption on the portable electronic device can be reduced.

FIG. 1 is an illustration of an exemplary signal environment 100 of a portable electronic device 104. FIG. 1 shows that the portable electronic device 104 located in an enclosed volume 106 in an indoor high attenuation environment 102 receives attenuated wireless signals such as the wireless signals 110. These attenuated wireless signals 110 may indicate that availability of GNSS signals 108 is unlikely, and thus, activating (e.g., enabling or "turning on") a GNSS tracker 116 of the portable electronic device 104 may not be warranted. In this manner, by not activating the GNSS tracker 116, a power usage (e.g., battery power usage) of a GNSS receiver 118 of the portable electronic device 104 is reduced.

The portable electronic device 104 located in an outdoor low attenuation environment 122 receives substantially non-attenuated wireless signals 114. These substantially non-attenuated wireless signals 114 indicate availability of a GNSS signal 112 is likely, and thus, activating the GNSS tracker 116 is warranted by the portable electronic device 104 for successful GNSS tracking.

In some physical environments, the GNSS signals 108 are blocked or attenuated to a point that they cannot be reliably tracked by the portable electronic device 104 and used for navigation. For example, in many indoor environments such as the enclosed volume 106, a roof 120 of the enclosed volume 106 may block or attenuate the GNSS signals 108 to a point of being ineffective for navigation by the portable electronic device 104.

When the portable electronic device 104 is in an environment where the GNSS signals 108 are unlikely to be useful for navigation, leaving the GNSS tracker 116 deactivated (e.g., disabled or "turned off") is desirable. This can eliminate power consumption that would otherwise not lead to a successful navigation solution, and may therefore be wasted power.

The portable electronic device 104 may support many consumer applications. For example, many financial transactions utilize mobile devices such as cell phones or laptops indoors such as within a city building. The portable electronic device 104 may comprise communication devices such as, but without limitation, a desktop computer, a laptop or notebook computer, an iPad™, an iPod™, a cell phone, a personal digital assistant (PDA), a mainframe, a server, a router, an internet protocol (IP) node, a server, a Wi-Fi node, a client, or other type of special or general purpose computing device as may be desirable or appropriate for a given application or environment.

Under general operation (i.e., without reducing GNSS receiver power usage described in embodiments herein), the GNSS receiver 118 may not efficiently determine whether a location of the GNSS receiver 118 is in a signal attenuated environment such as the indoor high attenuation environment 102 until after the GNSS receiver 118 has already spent significant power trying to track the GNSS signals 108. In a time needed for the GNSS receiver 118 to determine that the GNSS signals 108 cannot be tracked, significant power may have already been consumed and wasted. In addition, the portable electronic device 104 may continue to consume power trying to track the GNSS signals 108 based on an expectation that a user will eventually move the portable electronic device 104 to an environment such as the outdoor low attenuation environment 122 in which the GNSS signals 108 can be tracked. For example, the user may move the portable electronic device 104 from the indoor high attenuation environment 102 to the outdoor low attenuation environment 122. This continued effort to track the GNSS signal 108 may lead to a further waste of power on the portable electronic device 104.

Figure 2:
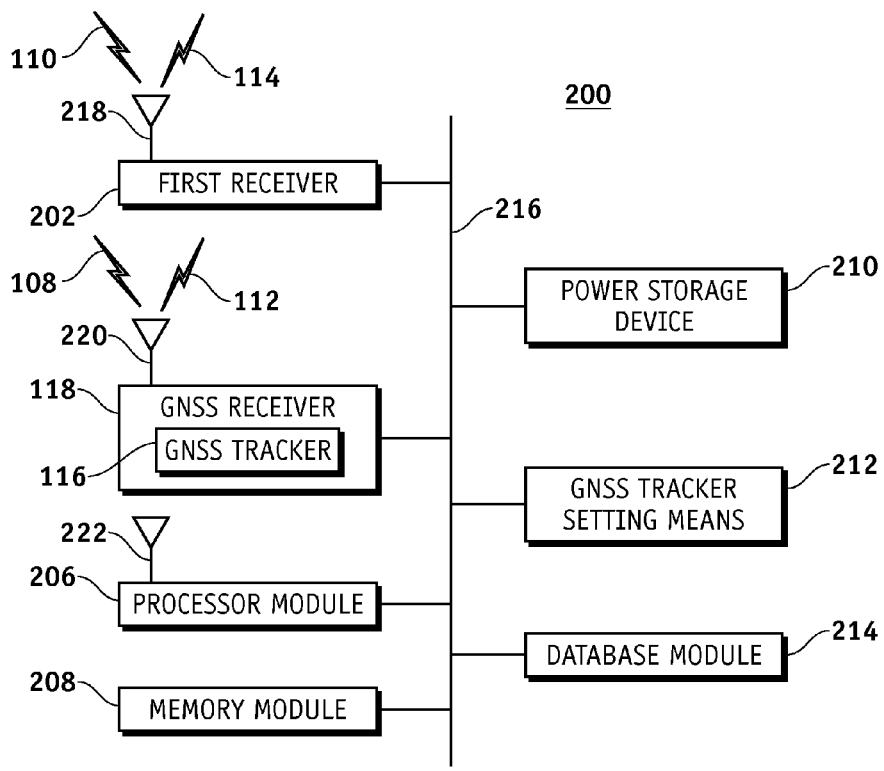
FIG. 2 is an illustration of an exemplary functional block diagram according to an embodiment of the disclosure.

FIG. 2 is an illustration of an exemplary functional block diagram of a portable electronic device 200 (104 in FIG. 1) for reducing GNSS receiver power usage according to an embodiment of the disclosure. The device/system 200 may comprise a first receiver 202, the GNSS receiver 118, a processor module 206, a memory module 208, a power storage device 210, a GNSS tracker setting means 212, and a database module 214.

The first receiver 202 is configured to receive at least one wireless signal 110/114 at the portable electronic device 200 (104 in FIG. 1) via an antenna 218 in the signal environment 100, and measure at least one signal characteristic of the wireless signal 110/114 at the portable electronic device 200 in the signal environment 100.

The processor module 206 is configured to estimate an estimated signal strength of at least one of the wireless signal (s) 110/114 in the signal environment 100 based on the signal characteristic, and compare the estimated signal strength to an expected signal strength of the wireless signal 110/114 to calculate an estimated signal-strength-change relative to the expected signal strength. The estimated signal-strength-change of the wireless signal 110/114 comprises a measure of the wireless signal 110/114 used for estimating an expected GNSS signal-strength-change. The estimated signal-strength-change of the wireless signal 110/114 may comprise an estimated attenuation of the wireless signal 110/114. Thus, an estimated signal attenuation of the wireless signal 110/114 is used to estimate an expected GNSS signal attenuation. In this manner, a GNSS signal attenuation is substantially predicated.

The signal characteristic may comprise, for example but without limitation, a signal frequency, a signal amplitude, a signal phase, a signal power, a signal noise, a signal time delay, and/or other signal characteristic. The estimated signal strength may comprise, for example but without limitation, an estimated received signal strength indicator (RSSI), an estimated signal-to-noise ratio ($C/N_0$), an estimated signal-to-interference ratio (C/I), or other measure.

The processor module 206 may also be configured to measure a remaining portable storage power of the power storage device 210.

In an embodiment, the GNSS receiver 118 is configured to stop receiving the GNSS signal 108/112 at the portable electronic device 200, if the remaining electrical storage capacity of the power storage device 210 is less than a threshold. The threshold may comprise, for example but without limitation, about 80 milliamp hours to about 100 milliamp hours, or other threshold.

The power storage device 210 may comprise a battery, a capacitor, or other energy storage device.

The GNSS receiver 118 is also configured to receive and track the GNSS signal 108/112 at the portable electronic device 200 via an antenna 220, if the estimated signal-strength-change of the wireless signal 110/114 indicates an expected GNSS signal attenuation is lower than a signal attenuation threshold.

The GNSS receiver 118 is also configured to reconfigure a receiving procedure for receiving the GNSS signal 108/112 at the portable electronic device 200, if the estimated signal-strength-change of the wireless signal 110/114 indicates the expected GNSS signal attenuation is greater than the signal attenuation threshold.

Reconfiguring receiving and/or tracking the GNSS signal 108/112 may comprise, for example but without limitation, activating or deactivating (e.g., turning "on" or "off") GNSS receiving and/or tracking based on the estimated signal-strength-change which indicates the estimated signal attenuation of the wireless signal 110/114. For example but without limitation, reconfiguring receiving and/or tracking the GNSS signal 108/112 may comprise, an activation of a receiver, a deactivation of a receiver, an activation of a tracking module, a deactivation of a tracking module, a change of an activation pattern of a receiver and/or a tracking module, a change of a deactivation pattern of a receiver and/or a tracking module, establishing a low-power mode, or other reconfiguration.

Thus, the GNSS receiver 118 may stop attempting to track the GNSS signal 108/112, for example, by deactivating (e.g., "turning off") the GNSS tracker 116, if the estimated signal attenuation of the wireless signal 110/114 is greater than the signal attenuation threshold, or may attempt to lock on to the GNSS signal 108/112 only at a periodic rate based on the estimated signal-strength-change of the wireless signal 110/114, if the estimated signal attenuation of the wireless signal 110/114 is greater than the signal attenuation threshold.

The signal attenuation threshold may comprise, for example but without limitation, about −20 dB, to about −25 dB, or other signal attenuation threshold.

The periodic rate may comprise, for example but without limitation, about a 5 minute interval to about a 10 minute interval, if the estimated signal attenuation is low. The periodic rate may comprise, for example but without limitation, an about 30 minute interval to an about 40 minute interval, if the estimated signal attenuation is high.

The GNSS signal 108/112 may be transmitted from at least one of: an LEO satellite, an MEO satellite, a GEO satellite, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, a Galileo™ satellite, or other satellite. At least one satellite may comprise a satellite from a future constellation. Additionally, each of the satellites may comprise a low Earth orbiting (LEO) satellite, a medium Earth orbiting (MEO) satellite, and/or a geosynchronous Earth orbiting (GEO) satellite.

In one embodiment, the wireless signal 110/114 comprises an Iridium satellite-based signal (and/or an Iridium-NEXT-based signal). A signal-to-noise ratio ($C/N_0$) of the Iridium satellite-based signal may be measured with less power consumption than that of the GNSS signal 108/112. This is because a received signal power of the Iridium satellite-based signal is generally higher and a signal structure of an Iridium satellite-based signal contains a carrier tone that is generally easier to lock on to than the GNSS signals 108/112. In this example, if the signal-to-noise ratio ($C/N_0$) of the Iridium-based signal is above a pre-determined threshold, then it is likely that a user has a clear view of the sky. In this example, the estimated signal strength of the wireless signal 110/114 may result in the estimated signal-strength-change indicating the expected GNSS signal attenuation is lower than the signal attenuation threshold. Therefore, for this example, it is likely that the GNSS receiver 118 will be able to successfully track the GNSS signal 108/112 to perform a navigation fix, so GNSS tracking on the portable electronic device 200 is activated ("turned on").

However, for this example, if the signal-to-noise ratio ($C/N_0$) of the Iridium satellite-based signal is below the pre-determined threshold, then it is likely that the user does not have a clear view of the sky. In this example, the estimated signal strength of the wireless signal 110/114 may result in the estimated signal-strength-change indicating the expected GNSS signal attenuation is greater than the signal attenuation threshold. Therefore, for this example, it is likely that the GNSS receiver 118 will not be able to successfully perform a navigation fix, so the GNSS tracker 116 on the portable electronic device 200 is deactivated (e.g., "turned off").

In an alternate embodiment, the wireless signal 110/114 may comprise any satellite signal. For example, a commercial radio broadcast (such as XM/Sirius), a commercial television broadcast (e.g., DirectTV), or another satellite communication signal (e.g., Globalstar). Similar to the Iridium-based signal discussed above, if a signal power received for these signals is low then it is likely that the GNSS receiver 118 will be unable to track the GNSS signal 108 with sufficient quality for navigation. In this example, the estimated signal strength of the wireless signal 110/114 may result in the estimated signal-strength-change indicating the expected GNSS signal attenuation is greater than the signal attenuation threshold.

In another embodiment, a ground-based transmitter may provide the wireless signal 110. For example, a cellular tower signal (cellular signal), a local ground-based radio signal, or a local ground-based television broadcast signal may provide the wireless signal 110. Lower signal levels from these signal sources may indicate that a user is indoors.

In another embodiment, Wi-Fi or other local signals may provide the wireless signal 110. In this case, a high-power Wi-Fi signal is likely an indication of an indoor user, and an absence of high-power Wi-Fi signals is potentially an indication of an outdoor user.

The database module 214 is configured to store the expected signal strength of the wireless signals 110 measured in an indoor high attenuation environment 102 in FIG. 1 versus wireless signals 114 measured in an outdoor low attenuation environment 122 in FIG. 1.

The GNSS tracker setting means 212 may be configured to disable the GNSS tracker 116 to enable a power saving mode for the portable electronic device 200, or to enable the GNSS tracker 116 to disable the power saving mode of the portable electronic device 200, e.g., in response to a user input. The user input may comprise, for example but without limitation, a voice signal, a touch signal, a press signal, or other activation input.

In one embodiment, the GNSS tracker setting means 212 is configured to set the device 200 into an automatic configuration where the power saving mode is enabled and disabled automatically by the processor module 206. The GNSS tracker setting means 212 may comprise a key, an icon, or other means for disabling/enabling/automating the GNSS tracker 116.

The processor module 206, may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. The processor module 206 comprises processing logic that is configured to carry out the functions, techniques, and processing tasks associated with the operation of the system 200.

In particular, the processing logic is configured to support the method for reducing GNSS receiver power usage as described above. Furthermore, the steps of a method or algorithm described in connection with the embodiments disclosed herein may be embodied directly in hardware, in firmware, in a software module executed by the processor module 206 or in any combination thereof.

The memory module 208, may be realized as a non-volatile storage device (non-volatile semiconductor memory, hard disk device, optical disk device, and the like), a random access storage device (for example, SRAM, DRAM), or any other form of storage medium known in the art. The memory module 208 may be coupled to the processor module 206 can read information from, and write information to, the memory module 208.

As an example, the processor module 206 and memory module 208 may reside in their respective ASICs. The memory module 208 may also be integrated into the processor module 206. In an embodiment, the memory module 208 may include a cache memory for storing temporary variables or other intermediate information during execution of instructions to be executed by the processor module 206. The memory module 208 may also include non-volatile memory for storing instructions to be executed by the processor module 206.

The memory module 208 may store a power threshold, signal attenuation threshold, the periodic rate, the database module 214, the received signal strength indicator (RSSI), the estimated signal-to-noise ratio ($C/N_0$), the estimated signal-to-interference ratio (C/I), and other data in accordance with an embodiment of the disclosure.

Those skilled in the art will understand that the various illustrative blocks, modules, circuits, and processing logic described in connection with the embodiments disclosed herein may be implemented in hardware, computer-readable software, firmware, or other combination thereof. To clearly illustrate this interchangeability and compatibility of hardware, firmware, and software, various illustrative components, blocks, modules, circuits, and steps are described generally in terms of their functionality.

In some embodiments, the system 200 may comprise any number of processor modules, any number processing modules, any number of memory modules, any number of transmitter modules, and any number of receiver modules suitable for their operation described herein. The illustrated system 200 depicts a simple embodiment for ease of description. These and other elements of the system 200 are interconnected together, allowing communication between the various elements of system 200. In one embodiment, these and other elements of the system 200 may be interconnected together via a respective data communication bus 216.

A transmitter module and a receiver module may be located in the processor module 206 coupled to a shared antenna 222. Although in a simple module only one shared antenna 222 may be provided, more sophisticated modules may be provided with multiple and/or more complex antenna configurations. Additionally, although not shown in this FIG. 2, those skilled in the art will recognize that a transmitter may transmit to more than one receiver, and that multiple transmitters may transmit to a same receiver.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Figure 3:
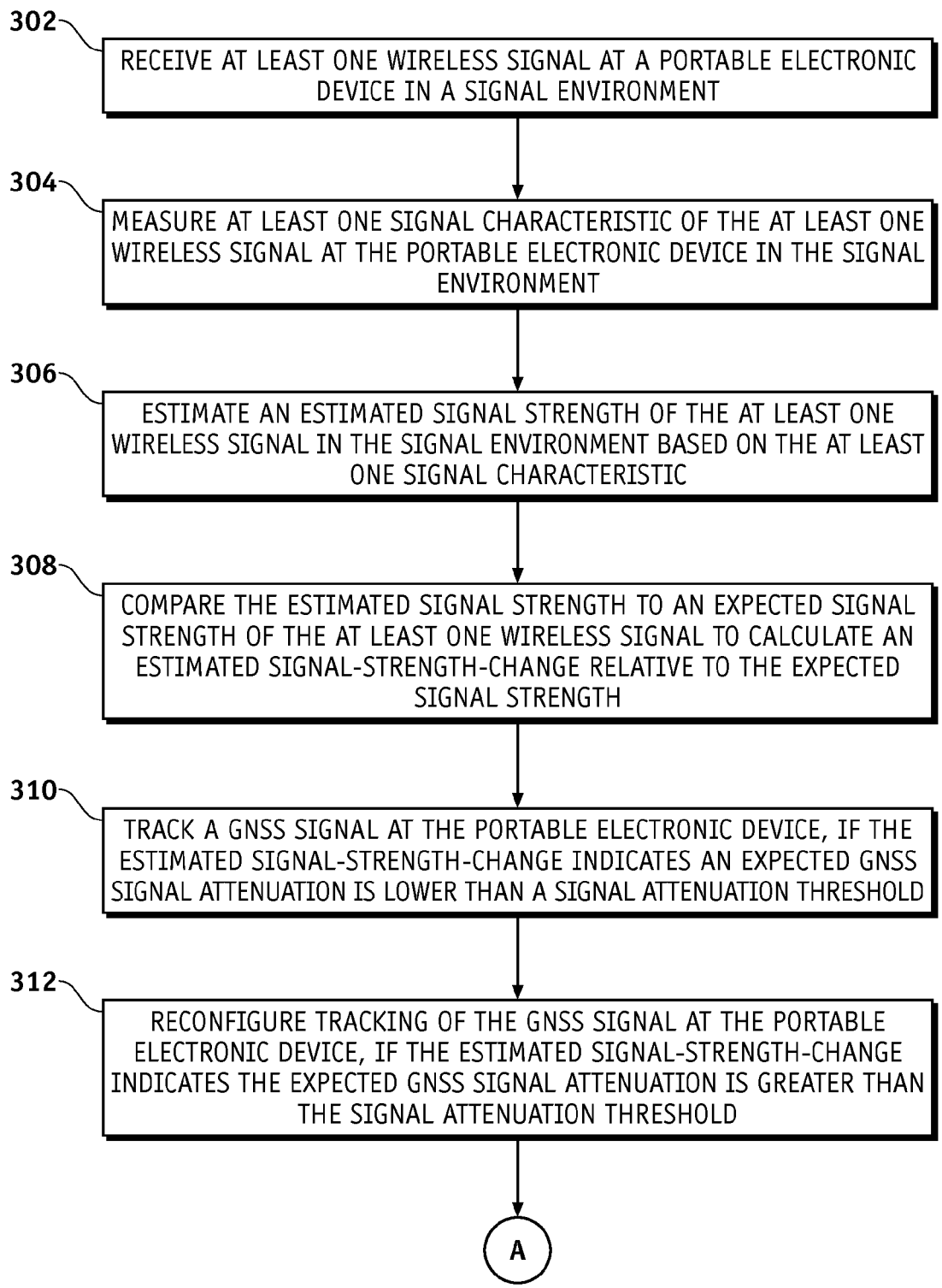
FIG. 3 is an illustration of an exemplary flowchart showing a process for reducing a GNSS receiver power usage according to an embodiment of the disclosure.
Figure 3:
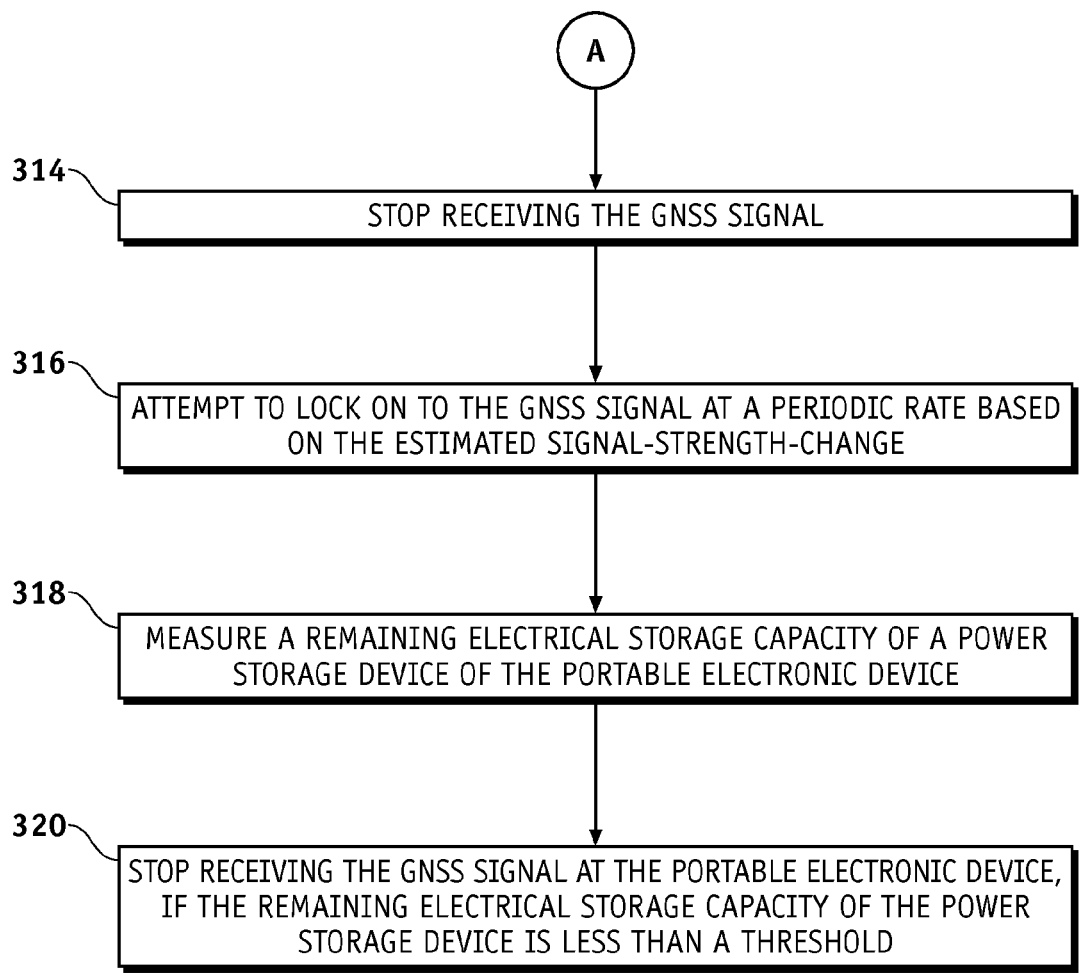

FIG. 3 is an illustration of an exemplary flowchart showing a process 300 for reducing a GNSS receiver power usage according to an embodiment of the disclosure. The various tasks performed in connection with the process 300 may be performed by software, hardware, firmware, a computer-readable medium having computer executable instructions for performing the process method, or any combination thereof. The process 300 may be recorded in a computer-readable medium such as a semiconductor memory, a magnetic disk, an optical disk, and the like, and can be accessed and executed, for example, by a computer CPU such as the processor module 206 in which the computer-readable medium is stored.

It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. In some embodiments, portions of the process 300 may be performed by different elements of the signal environment 100 and system 200 such as: the first receiver 202, the GNSS receiver 118, the processor module 206, the power storage device 210, the GNSS tracker setting means 212, and the database module 214, etc. Process 300 may have functions, material, and structures that are similar to the embodiments shown in FIGS. 1-2. Therefore common features, functions, and elements may not be redundantly described here.

Process 300 may begin by receiving at least one wireless signal such as the wireless signal 110/114 at a portable electronic device such as the portable electronic device 104/200 in a signal environment such as the signal environment 100 (task 302).

Process 300 may continue by measuring at least one signal characteristic of the at least one wireless signal 110/114 at the portable electronic device 104/200 in the signal environment 100 (task 304).

Process 300 may continue by estimating an estimated signal strength of the at least one wireless signal 110/114 in the signal environment 100 based on the at least one signal characteristic (task 306).

Process 300 may continue by comparing the estimated signal strength to an expected signal strength of the at least one wireless signal 110/114 to calculate an estimated signal-strength-change relative to the expected signal strength (task 308).

Process 300 may continue by tracking a GNSS signal such as the GNSS signal 108/112 at the portable electronic device 104/200, if the estimated signal-strength-change indicates an expected GNSS signal attenuation is lower than a signal attenuation threshold (task 310).

Process 300 may continue by reconfiguring tracking of the GNSS signal 108/112 at the portable electronic device 104/200, if the estimated signal-strength-change indicates the expected GNSS signal attenuation is greater than the signal attenuation threshold (task 312).

Process 300 may continue by stopping receiving the GNSS signal 108/112 (task 314).

Process 300 may continue by attempting to lock on to the GNSS signal 108/112 at a periodic rate based on the estimated signal-strength-change (task 316).

Process 300 may continue by measuring a remaining electrical storage capacity of a power storage device such as the power storage device 210 of the portable electronic device 104/200 (task 318).

Process 300 may continue by stopping receiving the GNSS signal 108/112 at the portable electronic device 104/200, if the remaining electrical storage capacity of the power storage device 210 is less than a threshold (task 320).

In this manner, embodiments of the disclosure provide system and methods for reducing navigation satellite receiver power usage.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 206, perform specified operations. Such instructions, generally referred to as "computer program code" or "program code" (which may be grouped in the form of computer programs or other groupings), when executed, enable a method of using the system 200.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 2 depicts example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for reducing GNSS receiver power usage in a portable electronic device, the method comprising:
    receiving at least one wireless signal at a portable electronic device in a signal environment, the at least one wireless signal comprising at least one satellite signal;
    measuring at least one signal characteristic of the at least one wireless signal at the portable electronic device in the signal environment;
    estimating an estimated signal strength of the at least one wireless signal in the signal environment based on the at least one signal characteristic;
    comparing the estimated signal strength to an expected signal strength of the at least one wireless signal to calculate an estimated signal-strength-change relative to the expected signal strength;
    tracking a GNSS signal at the portable electronic device, if the estimated signal-strength-change indicates an expected GNSS signal attenuation is lower than a signal attenuation threshold; and
    reconfiguring tracking of the GNSS signal at the portable electronic device, if the estimated signal-strength-change indicates the expected GNSS signal attenuation is greater than the signal attenuation threshold.

2. The method of claim 1, further comprising reconfiguring the tracking of the GNSS signal by stopping receiving the GNSS signal.

3. The method of claim 1, further comprising reconfiguring the tracking of the GNSS signal by attempting to lock on to the GNSS signal at a periodic rate based on the estimated signal-strength-change.

4. The method of claim 1, further comprising:
    measuring a remaining electrical storage capacity of a power storage device of the portable electronic device; and
    stopping receiving the GNSS signal at the portable electronic device, if the remaining electrical storage capacity is less than a threshold.

5. The method of claim 1, further comprising estimating the estimated signal strength by an estimated received signal strength indicator (RSSI), an estimated signal-to-noise ratio ($C/N_0$), or an estimated signal-to-interference ratio (C/I).

6. The method of claim 1, further comprising transmitting the GNSS signal from an LEO satellite, an MEO satellite, a GEO satellite, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, or a Galileo™ satellite.

7. The method of claim 1, further comprising receiving the at least one satellite signal comprising a Low Earth Orbiting (LEO) satellite signal, or an Iridium satellite-based signal.

8. A system for reducing GNSS receiver power usage in a portable electronic device, the system comprising:
    a first receiver operable to:
        receive at least one wireless signal at a portable electronic device in a signal environment, the at least one wireless signal comprising at least one satellite signal; and
        measure at least one signal characteristic of the at least one wireless signal at the portable electronic device in the signal environment;
    a processor module operable to:
        estimate an estimated signal strength of the at least one wireless signal in the signal environment based on the at least one signal characteristic; and
        compare the estimated signal strength to an expected signal strength of the at least one wireless signal to calculate an estimated signal-strength-change relative to the expected signal strength; and
    a second receiver operable to:
        receive a GNSS signal at the portable electronic device, if the estimated signal-strength-change indicates an expected GNSS signal attenuation lower than a signal attenuation threshold; and
        reconfigure a receiving procedure for receiving the GNSS signal at the portable electronic device, if the estimated signal-strength-change indicates the expected GNSS signal attenuation is greater than the signal attenuation threshold.

9. The system of claim 8, wherein the second receiver is further operable to stop receiving the GNSS signal by deactivating a GNSS tracker, if the signal attenuation is greater than the signal attenuation threshold.

10. The system of claim 8, wherein the second receiver is further operable to attempt to lock on to the GNSS signal at a periodic rate based on the estimated signal-strength-change.

11. The system of claim 8, wherein the processor is further operable to measure a remaining electrical storage capacity of a power storage device of the portable electronic device.

12. The system of claim 11, wherein the second receiver is further operable to stop receiving the GNSS signal at the portable electronic device by deactivating a GNSS tracker, if the remaining electrical storage capacity is less than a threshold.

13. The system of claim 8, wherein the estimated signal strength comprises one of: an estimated received signal strength indicator (RSSI), an estimated signal-to-noise ratio ($C/N_0$), and an estimated signal-to-interference ratio (C/I).

14. The system of claim 8, wherein the GNSS signal is transmitted from at least one of the group consisting of: an LEO satellite, an MEO satellite, a GEO satellite, a Global Navigation Satellite System (GNSS) satellite, a Global Positioning System (GPS™) satellite, a Globalnaya Navigatsionnaya Sputnikovaya Sistema (GLONASS™) satellite, a BeiDou Navigation System (COMPASS™) satellite, and a Galileo™ satellite.

15. The system of claim 8, wherein the at least one satellite signal comprises a Low Earth Orbiting (LEO) satellite, or an Iridium satellite-based signal.

16. The system of claim 8, further comprising a database module comprising the expected signal strength of the at least one wireless signal measured in an outdoor low attenuation environment.

17. The system of claim 8, further comprising a GNSS tracker setting means operable to perform one of: disable a GNSS tracking mode to enable a power saving mode for the portable electronic device, enable the GNSS tracking mode to disable the power saving mode of the portable electronic device, and set the portable electronic device into an automatic configuration where the power saving mode is enabled and disabled automatically by the processor module.

18. A non-transitory computer readable storage medium comprising computer-executable instructions for reducing satellite receiver power usage in portable electronic device, the computer-executable instructions comprising:
  receiving at least one wireless signal at a portable electronic device in a signal environment, the at least one wireless signal comprising at least one satellite signal;
  measuring at least one signal characteristic of the at least one wireless signal at the portable electronic device in the signal environment;
  estimating an estimated signal strength of the at least one wireless signal in the signal environment based on the at least one signal characteristic;
  comparing the estimated signal strength to an expected signal strength of the at least one wireless signal to calculate an estimated signal-strength-change relative to the expected signal strength;
  tracking a GNSS signal at the portable electronic device, if the estimated signal-strength-change indicates an expected GNSS signal attenuation is lower than a signal attenuation threshold; and
  reconfiguring tracking of the GNSS signal at the portable electronic device, if the estimated signal-strength-change indicates the expected GNSS signal attenuation is greater than the signal attenuation threshold.

19. The non-transitory computer readable storage medium of claim 18, wherein the computer-executable instructions for the reconfiguring tracking of the GNSS signal further comprise computer-executable instructions for stopping receiving the GNSS signal.

20. The non-transitory computer readable storage medium of claim 18, wherein the computer-executable instructions for the reconfiguring tracking of the GNSS signal further comprise computer-executable instructions for attempting to lock on to the GNSS signal at a periodic rate based on the estimated signal-strength-change.

* * * * *